United States Patent [19]

Kornitzky et al.

[11] Patent Number: 4,836,765
[45] Date of Patent: Jun. 6, 1989

[54] MOLDING APPARATUS FOR COMPOSITE MATERIALS

[75] Inventors: Michael A. Kornitzky, Branford; Alexander C. Dublinski, Northford, both of Conn.

[73] Assignee: United Technologies Corporation, Hartford, Conn.

[21] Appl. No.: 128,306

[22] Filed: Dec. 3, 1987

[51] Int. Cl.⁴ .............................................. B29C 43/10
[52] U.S. Cl. ........................... 425/388; 156/285; 425/389; 425/405.2; 425/DIG. 60
[58] Field of Search ............ 101/382 MV; 269/8, 22; 425/405.1, 388, 389, 387.1, DIG. 60, DIG. 44, 405.2; 156/382, 285, 286

[56] References Cited

U.S. PATENT DOCUMENTS

| | | | |
|---|---|---|---|
| 2,805,974 | 9/1957 | Bruckner | 156/286 |
| 3,173,066 | 3/1965 | Roode | 101/382 MV |
| 3,198,047 | 8/1965 | Munz | 269/8 |
| 3,665,355 | 5/1972 | Sasaki et al. | 101/382 MV |
| 3,666,600 | 5/1972 | Yoshino | 156/382 |
| 3,700,226 | 10/1972 | Mrugala | 269/22 |
| 3,837,084 | 9/1974 | Johnson | 269/8 |
| 4,078,031 | 3/1978 | Bishop | 101/382 MV |
| 4,280,804 | 7/1981 | Holland | 425/388 |
| 4,287,015 | 9/1981 | Danner, Jr. | 156/382 |
| 4,312,829 | 1/1982 | Fourcher | 425/389 |
| 4,451,321 | 5/1984 | McKelvey | 156/382 |
| 4,484,745 | 11/1984 | Sleeper | 273/157 R |
| 4,562,033 | 12/1985 | Johnson et al. | 156/286 |
| 4,698,115 | 10/1987 | Dodds | 156/382 |

Primary Examiner—Willard Hoag

[57] ABSTRACT

Permanent magnets embedded within the periphery of a vacuum bag seal the bag to rigid mold during the curing of composite laminate lay-ups.

7 Claims, 3 Drawing Sheets

MOLDING APPARATUS FOR COMPOSITE MATERIALS

DESCRIPTION

This invention was made with Government support under a contract awarded by the Department of the Army. The Government has certain rights in this invention.

DESCRIPTION

Technical Field

This invention relates to the molding of composite materials and particularly to the molding of such materials by vacuum bagging techniques.

BACKGROUND ART

There are a number of techniques currently in use for the molding of composite laminates into desired shapes. One technique for molding such materials into broad contoured surfaces (among other shapes) is known as "vacuum bagging". In such a process, composite laminates in an uncured or partially cured state are layed up on a rigid mold and are then covered with a flexible mold often referred to as a "vacuum bag". The vacuum bag is sealed around the periphery thereof to a peripheral portion of the rigid mold or supporting structure therefor and a negative pressure is applied to the interior of the cavity defined by the two molds. This causes the application of ambient pressure exteriorly of the flexible mold to be applied thereto and the underlying composite lay-up for conformance of the lay-up to the rigid mold as the composite is cured. Those skilled in the art will appreciate that the quality of the finished composite product will in large measure depend upon the quality of the seal between the flexible vacuum bag and the rigid mold.

The prior art is repleat with various techniques for sealing the vacuum bag to the rigid mold. One technique involves the use of adhesives or semi-adhesives such as zinc chromate putty as a sealant between the vacuum bag and rigid mold. The application of such sealants is very labor intensive, requiring the time consumming removal of old sealant and application of new sealant between molding operations, and is, therefore, not well adapted to automated techniques. Furthermore, such sealants may not be compatible with certain vacuum bag compositions without special primers which further contribute to the time consumed in, and the cost of the molding operation. Moreover, to a certain extent, such sealants are unreliable, requiring the utilization of electronic leak sensors to monitor potential leakage past the sealant into the mold cavity.

Mechanical fasteners such as ribbed or flanged zippers, adhesive tape, clamps and the like are also used to seal vacuum bags to rigid molds in composite molding operations. However, the use of such fasteners is, like the use of adhesives described hereinabove, very labor intensive, requiring extensive, time consuming manipulation of the bag by a mechanic with an attendant, significant risk of vacuum bag damage from such manipulation each time the molds are assembled and disassembled.

It will also be appreciated by those skilled in the art, that neither adhesive sealants nor mechanical clamps allow any sliding movement of the vacuum bag over the composite lay-up and/or the rigid mold. Such movement may, in certain cases, be desirable to enhance the conformance of the vacuum bag to the rigid mold and lay-up, thus avoiding bridging of discontinuities by the vacuum bag, and to minimize damage to the vacuum bag due to plastic deformation or rupture thereof.

Accordingly, a technique for sealing a vacuum bag to a rigid mold in a composite molding operation, which is reliable, less labor intensive then present techniques and which permits a certain amount of sliding movement between the vacuum bag and the composite lay-up or rigid mold periphery is desirable.

DISCLOSURE OF INVENTION

It is therefore a principle object of the present invention to provide an improved technique for sealing a vacuum bag to a rigid mold in a composite molding operation.

It is a further object of the present invention to provide such a technique in which the amount of manual labor and manipulation of mold components is minimized, whereby such a technique may be adapted to automated processes.

It is a further object of the present invention to provide such a technique wherein reliability of the seal between the flexible and rigid molds is enhanced.

It is another object of the present invention to provide such a technique wherein risk of damage to the vacuum bag is minimized.

It is another object of the present invention to provide such a technique which allows a certain degree of sliding movement between the vacuum bag and rigid mold and/or composite lay-up to minimize damage to the vacuum bag and any tendency of the bag to bridge discontinuities in the surface of the rigid mold.

In accordance with the present invention, in a process for molding composite laminates, a vacuum bag is sealed to a rigid mold with permanent or electric magnets which allow a measure of sliding movement of the vacuum bag over the surface of the rigid mold or the composite lay-up to minimize damage and plastic deformation of the vacuum bag and any tendency of the bag to bridge discontinuities in the rigid mold surface. Such a magnetic seal allows the vacuum bag to be assembled quickly to the rigid mold whereby the seal is well suited for use with automated techniques. Since the seal does not require folding, clamping or other significant mechanical manipulation of the bag, risk of damage to the bag is minimized.

In one embodiment, the rigid mold (or the periphery of a supporting structure therefor) is provided with a ferromagnetic frame. Permanent high temperature magnets, embedded within the periphery of the vacuum bag, seal the bag to the rigid mold whereby an effective seal between the vacuum bag and rigid mold is established merely by covering a composite lay-up on the rigid mold with the vacuum bag. In an alternate embodiment, permanent magnets are embedded within the rigid mold. Ferromagnetic material embedded in the edge of the vacuum bag magnetically seals the vacuum bag to the rigid mold. In yet another alternate embodiment, electromagnets may be embedded in the mold or table whereby the magnetic sealing force may be adjusted if desired during the molding operation.

BEST MODE FOR CARRYING OUT THE INVENTION AND INDUSTRIAL APPLICABILITY

Figure 1:
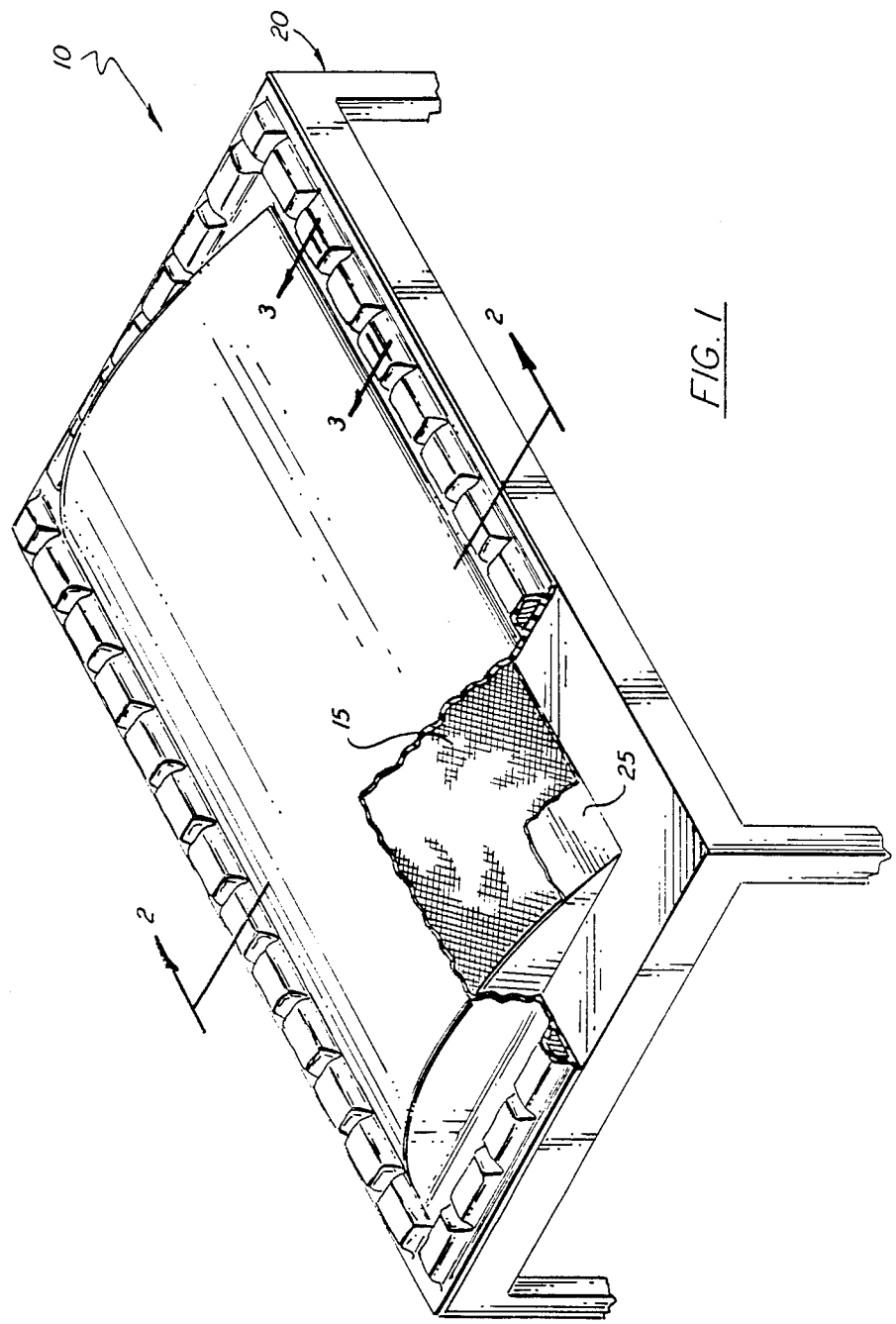
FIG. 1 is a perspective view of a mold assembly for the molding of composite laminates, such assembly employing the seal of the present invention between a flexible mold or vacuum bag and a rigid mold.
Figure 2:
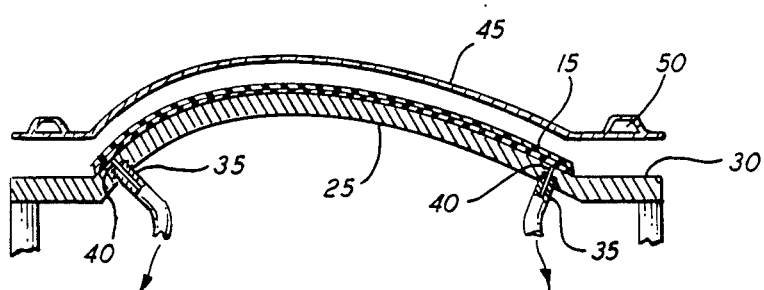
FIG. 2 is a sectioned, partly exploded elevation taken along line 2—2 of FIG. 1.
Figure 3:
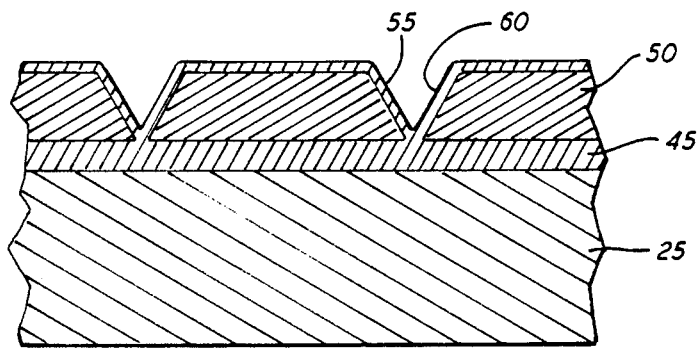
FIG. 3 is a sectioned elevation taken along line 3—3 of FIG. 1.

Referring to FIGS. 1 through 3, an assembly 10 for the vacuum bag molding of a laminated composite lay-up 5, comprises a stand 20 provided with a rigid male mold 25 formed integrally with the top thereof. The male mold illustrated defines an airfoil shape although a rigid mold of any other convex or concave shape may be employed with equal utility. The mold is provided with a generally flat, rectangular ferromagnetic peripheral rim 30 and a number of negative pressure fittings 35 which communicate with vents 40 extending through the mold to the upper surface thereof. Vents 40 and their associated pressure fittings may instead be provided in the flexible mold half described hereinbelow. Mold 25 comprises a ferromagnetic material.

Composite lay-up 15 comprises a number of uncured composite sheets of such materials as woven glass fibers embedded in a matrix of uncured or partially cured binder such as epoxy resin. The uncured composite sheets composite sheets are quite flexible and readily assume the shape of the rigid mold. When the required number of composite sheets are laid-up on rigid mold 25, the assembly is covered with a flexible mold (vacuum bag) 45 formed from any suitable atmospherically impervious material such as fluoroelastomer sheeting or the like. In a manner well known in the art, the vacuum bag is sealed to the rigid mold around peripheral rim 30 and a negative pressure is applied through fittings 35 to the cavity between the rigid and flexible mold halves in which the composite is disposed, whereby the flexible mold is urged against the composite lay-up 15 while the lay-up is cured into the shape of the rigid mold.

As set forth hereinabove, known techniques for sealing the vacuum bag to the rigid mold exhibit a number of shortcomings in the areas of reliability, economy, labor intensity, and risk to the structural integrity of the vacuum bag itself. In accordance with the present invention, such shortcomings are, in great measure, eliminated by the magnetic sealing of the vacuum bag to the rigid mold around peripheral rim 30.

Still referring to FIGS. 1 through 3, it will be seen that vacuum bag 45 includes a multiplicity of permanent magnets 50 embedded around the periphery thereof whereby the magnetic attraction of the magnets for the peripheral rim of mold 25 securely seal the vacuum bag to the mold to securely shape the composite lay-up to the rigid mold as the lay-up is cured within the negative pressure between the two mold halves.

As perhaps best seen in FIGS. 1 and 3, permanent magnets 50 are of a solid, trapezoidal shape whereby adjacent magnets present inwardly and upwardly sloping surfaces 55 and 60 to one another, these surfaces defining angular clearances therebetween. Such clearances allow relative pivotal movement between adjacent magnets for ease in removing the vacuum bag from the rigid mold by peeling the periphery of the vacuum bag from the rigid mold. While any of various permanent magnet materials may be employed in magnets 50, the material used will depend upon the permiability of the vacuum bag, the magnitude of the negative pressure drawn through fittings 35, the temperature at which the composite is cured and the composition of peripheral portion 30 of the rigid mold. Under actual manufacturing conditions, where a rigid mold of steel was used to form fiber reinforced resin impregnated composite material at a temperature of about 300°–350° and a compaction pressure of 50 psi, a vacuum bag formed from fluoroelastomer was successfully sealed to the rigid mold with ceramic- type permanent magnets.

Figure 4:
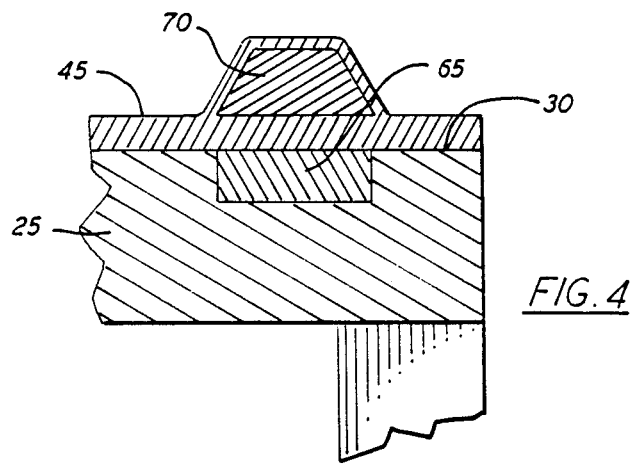
FIG. 4 is a view similar to FIG. 3 but illustrating a first alternate embodiment of the present invention.

Referring to FIG. 4, a first alternate embodiment of the present invention is shown to include a multiplicity of permanent magnets 65 embedded within the periphery 30 of rigid mold 25. Accordingly, vacuum bag 45 may be sealed to the rigid mold with either permanent magnets of polarity opposite to that of magnets 65 or ferromagnetic blocks 70 of the same general solid trapazoidal shape shown in FIGS. 1 through 3. The exact composition of permanent magnet 65 and blocks 70 will be determined by the composition of the vacuum bag and rigid mold as well as the conditions under which the composite lay-up is cured.

Figure 5:
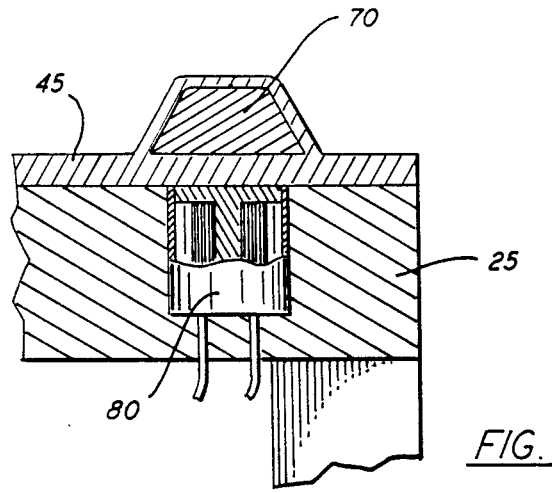
FIG. 5 is a view similar to FIG. 4 but illustrating a second alternate embodiment of the present invention.

FIG. 5 illustrates a second alternate embodiment, similar to that shown in FIG. 4, with the exception that the electromagnets 80, rather than permanent magnets are embedded in the periphery of the rigid mold. Again, as was the case with respect to the first and second embodiments described and illustrated herein, the structure, composition and electrical properties of the electromagnets will depend in large measure upon the compositions of the molds as well as the conditions under which the composite lay-up is cured. Electromagnets offer the added advantage of providing a mechanism by which the sealing forces between the mold halves may be controlled and adjusted during the molding operation by controlling the electrical input to the electromagents.

Figure 6:
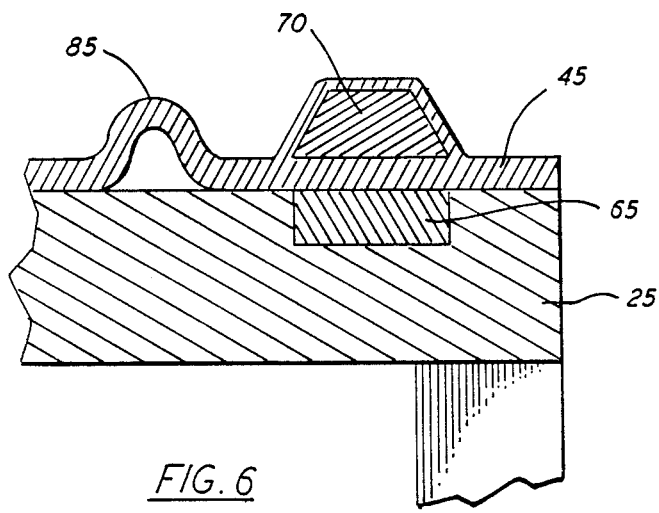
FIG. 6 is a view similar to FIG. 5 but illustrating a third alternate embodiment of the present invention.

FIG. 6 discloses yet another embodiment of the present invention wherein the vacuum bag is provided with a flexure or crease 85 at the periphery thereof, just inside the magnetic seal. Such a flexure would extend along one or more edges of the vacuum bag to enhance the bag's ability to slide along the upper surface of the rigid mold for enhanced conformance of the vacuum bag to the rigid mold surface.

It will be appreciated that the magnetic sealing of a vacuum bag to a rigid mold illustrated and described herein offers a number of advantages unavailable in prior art mechanical and adhesive sealing schemes. Since the seal is effected without excessive vacuum bag manipulation associated with clamps and other mechanical fasteners, the risk of damage to the vacuum bags as the mold is sealed and unsealed is reduced. Since the periphery of the vacuum bag remains generally planar, some relative movement of the vacuum bag over the rigid mold is available to accommodate high compaction forces due to high negative pressures applied to the cavity between the mold halves. This, of course, reduces any tendency of the vacuum bag to bridge sharp discontinuities in the rigid mold as well as reducing the risk of rupture or plastic deformation of the vacuum bag.

The vacuum bag is readily assembled to the rigid mold merely by placing the vacuum bag in registry thereover and easily removed from the rigid mold by peeling the magnetically sealed edges of the vacuum bag away from the rigid mold. This, of course, cuts down on the time required for assembling and disassembling the molds as well as the manufacturing costs associated with such operations, and further lends the sealing and unsealing of the molds to automated techniques.

The magnetic seal is compatible with vacuum bags of any composition, is very reliable, and requires no primers or other intermediary substances.

While particular embodiments of the present invention have been shown and described, it will be understood that various modifications to the present invention may be made without departing therefrom. For instance, while discrete magnetic blocks are shown herein, magnetic particulate matter may be molded into the vacuum bag for a continuous flexible seal. While certain compositions have been described, it will be appreciated that various other permanent magnetic and ferromagnetic compositions may be employed with equal utility. Although a particular shape of the rigid mold half is illustrated, various other shapes either concave or convex may be employed. Accordingly, it is intended by the following claims to cover these and any other modifications as may fall within the true spirit and scope of this invention.

Having thus described the invention, what is claimed is:

1. In an apparatus for the molding of composite laminates, said apparatus comprising a cavity defined by a rigid mold over which a lay-up of said composite laminates is formed, and a vacuum bag adapted for sealed engagement with said rigid mold, over said lay-up; said apparatus further comprising means for applying negative pressure to the interior of said cavity, the improvement characterized by:

magnetic means disposed at the location of engagement of said vacuum bag with said rigid mold for sealing said vacuum bag thereto, thereby easing the assembly of said vacuum bag to, and disassembly of said vacuum bag from said rigid mold while maintaining an airtight seal therebetween;

said magnetic means comprising a plurality of juxtaposed ferromagnetic members, peripherally aligned about the outer edge of said vacuum bag;

said ferromagnetic members having inwardly sloping adjacent surfaces which define angular clearances therebetween to allow relative pivotal movement between adjacent members.

2. The apparatus of claim 1 characterized by said vacuum bag including at a location thereon interiorly of said magnetic means, an extensible portion which allows sliding movement of said vacuum bag over said mold to reduce the risk of permanent distortion of said vacuum bag and the bridging by said vacuum bag of discontinuities defined by said rigid mold surface.

3. The apparatus of claim 1 characterized by at least one magnet embedded in said rigid mold, said ferromagnetic members being disposed around the periphery of said vacuum bag in alignment with said embedded magnet.

4. The apparatus of claim 3 characterized by said magnet comprising an electromagnet.

5. The apparatus of claim 1 further characterized by said magnetic means comprising at least one permanent magnet.

6. The apparatus of claim 5 characterized by said permanent magnet comprising a ceramic.

7. The apparatus of claim 5 characterized by said permanent magnet being embedded within an outer portion of said vacuum bag and by said rigid mold including a ferromagnetic peripheral portion aligned with said permanent magnet.

* * * * *